(12) United States Patent
Holliday

(10) Patent No.: US 12,087,253 B1
(45) Date of Patent: Sep. 10, 2024

(54) TRANSPARENT DATA DISPLAY WINDOW SYSTEM AND METHOD

(71) Applicant: Troy R. Holliday, Pasadena, CA (US)

(72) Inventor: Troy R. Holliday, Pasadena, CA (US)

( * ) Notice: Subject to any disclaimer, the term of this patent is extended or adjusted under 35 U.S.C. 154(b) by 131 days.

(21) Appl. No.: 17/959,760

(22) Filed: Oct. 4, 2022

Related U.S. Application Data

(60) Provisional application No. 63/253,008, filed on Oct. 6, 2021.

(51) Int. Cl.
  *G09G 5/36* (2006.01)
  *G06F 21/60* (2013.01)
  *G06K 19/06* (2006.01)

(52) U.S. Cl.
  CPC .............. *G09G 5/36* (2013.01); *G06F 21/602* (2013.01); *G06K 19/06037* (2013.01)

(58) Field of Classification Search
  CPC ..... G09G 2330/021; G09G 2300/0857; G09G 3/36; G09G 2300/0452
  See application file for complete search history.

(56) References Cited

U.S. PATENT DOCUMENTS

| | | | |
|---|---|---|---|
| 9,892,489 B1 | 2/2018 | Roggendorf et al. | |
| 10,854,002 B2 | 12/2020 | Nasi et al. | |
| 10,866,414 B2 | 12/2020 | Zhang et al. | |
| 10,922,886 B2 | 2/2021 | Piemonte et al. | |
| 10,970,560 B2 | 4/2021 | Khalfan et al. | |
| 2005/0213757 A1* | 9/2005 | Kunemund | H03K 19/003 380/44 |
| 2006/0215984 A1* | 9/2006 | Nesvadba | G11B 27/105 |
| 2009/0195652 A1 | 8/2009 | Gal | |
| 2012/0212613 A1 | 8/2012 | Yamaguchi et al. | |
| 2012/0256945 A1 | 10/2012 | Kidron et al. | |
| 2013/0142385 A1 | 6/2013 | Mathieu et al. | |
| 2013/0235351 A1 | 9/2013 | Sachdev et al. | |
| 2020/0115056 A1 | 4/2020 | Johnson | |
| 2021/0110791 A1 | 4/2021 | Sadovitch | |
| 2022/0201198 A1* | 6/2022 | Eshita | H04W 4/80 |

\* cited by examiner

*Primary Examiner* — Van N Chow
(74) *Attorney, Agent, or Firm* — John Rizvi, P.A.

(57) ABSTRACT

A transparent data display window apparatus, system, and method that receives and processes encrypted data in the form of non-fungible token (NFT) for display thereon. The transparent data display window receives and displays encrypted NFT data. The transparent data display window generates and embeds a unique time code within the transparent data display specific to a current display of the encrypted NFT data on the transparent data display such that the embedded unique time code is readable and recordable at a particular time by a user device proximate to the transparent data display window and useful for continuing the current display of the encrypted NFT data from the particular time of the recording of the embedded unique time code by the user device proximate to the transparent data display on another display device.

20 Claims, 12 Drawing Sheets

TRANSPARENT DATA DISPLAY WINDOW SYSTEM AND METHOD

CROSS-REFERENCE TO RELATED APPLICATION

This application claims the benefit of U.S. Provisional Patent Application No. 63/253,008, filed Oct. 6, 2021, which is hereby incorporated by reference herein in its entirety.

FIELD OF THE INVENTION

The present invention relates generally to virtual reality systems, and more particularly, to a system and method by which transparent data display windows deliver an immersive user experience.

BACKGROUND OF THE INVENTION

Virtual reality is a computer-simulated environment that can simulate a user's physical presence in real or imaginary environments. A virtual reality environment typically includes visual images displayed either on a computer screen or through stereoscopic (e.g., 3-dimensional (3D)) displays. Virtual reality then is a simulated environment designed to provide a user with an immersive interactive sensory experience that seeks to replicate the sensory experience of the user's physical presence in an artificial environment, such as a reality-based environment or a non-reality-based environment, such as a video game. A virtual reality experience may include audio and haptic components, in addition to a visual component. In other words, in virtual reality, the physical presence of places in the real world, as well as imaginary worlds, can be simulated. The virtual reality environment may also include sound provided through speakers or headphones and force feedback via, for example, a dynamic platform or a vibrating controller or joystick.

Virtual reality experiences can be displayed using a display device, such as a viewing screen or virtual reality helmet. On the viewing screen, virtual reality can be displayed in three dimensions using stereo glasses. With a virtual reality helmet or smart glasses, virtual reality can be displayed in 3D using displays with a stereoscopic image. In addition, other sensory information such as sound and tactile feedback can also be created for virtual reality. It is a system simulation of interactive 3D dynamic scene and physical activity with multi-source information mixed. The virtual reality system uses a computer to generate an emulated environment and enables users to immerse in the environment. As such, virtual reality systems generate a virtual world for a user that responds to the user's movements Examples include several types of virtual reality headsets and goggles worn by a user, as well as specialized rooms with multiple displays. Virtual reality systems typically include sensors that track a user's head, eyes, or other body pans, and that modify the virtual world according to the user's movements. The virtual world consists of a 3D model, computer-generated or captured from real-world scenes. Images of the 3D model are generated based on the user's position and orientation. Generation of these images requires rendering of the 3D model onto one or more two-dimensional displays. Rendering techniques are known in the art and are often used for example in 3D graphics systems or computer-based games, as well as in virtual reality systems.

In this way, the visual component of virtual reality may be displayed either on a computer screen or with a stereoscopic head-mounted display (HMD) and commercially available virtual reality head-mounted display headsets. Some conventional HMDs simply project an image or symbology on a wearer's visor or reticle. The projected image is not slaved to the real world (i.e., the image does not change based on the wearer's head position). Other HMDs incorporate a positioning system that tracks the wearer's head position and angle, so that the picture or symbology projected by the display is congruent with the outside world using see-through imagery. Head-mounted displays may also be used with tracking sensors that allow changes of angle and orientation of the wearer to be recorded. When such data is available to the system providing the virtual reality environment, it can be used to generate a display that corresponds to the wearer's the angle-of-look at the particular time. This allows the wearer to "look around" a virtual reality environment simply by moving their head without the need for a separate controller to change the angle of the imagery. Wireless-based systems allow the wearer to move about within the tracking limits of the system. Appropriately placed sensors may also allow the virtual reality system to track the HM) wearer's hand movements to allow natural interaction with content and a convenient game-play mechanism.

Some conventional video games (and game engines) may include a static replay creation feature that records game-state data corresponding to a game session and allows a user to view a replay video of the game session within the video game. Third party tools that capture the display data generated during a game session and stores it in a video format for later playback are also known. Video-based replays created by the third party tools support sharing via online playback and commonly available video players but require much more storage space than replays created with in the context of the video game itself. These systems illustrate a recognition that video game users may desire to record a game session in order to replay at a later time or to distribute for others replay, for example, for entertainment purposes, similar to viewing a recorded sporting event. Game replays may also be used in the prevention and detection of cheating or to develop skill at a video game, for example, by watching better players and observing their techniques. Video game replays may also be used to raise stature in a particular game's user community, for example, to establish rankings among players or to settle disputes. Video game replays are also used to produce replay reviews, i.e., a review of a game replay by an experienced player to determine what can be done to improve and expand upon the original player's skill. However, despite advancements made in virtual reality systems, and given their increasing popularity and adoption in an increasing number of applications, there is a constant need for improved virtual reality mechanisms and techniques.

Accordingly, there is need for a system and method that improves upon and expands virtual reality capabilities and the associated immersive user experience.

SUMMARY OF THE INVENTION

The present invention is directed to a system, apparatus, and method that improves upon and expands virtual reality capabilities and the associated immersive user experience.

In a first implementation of the invention, a transparent data display window apparatus is provided that receives and processes encrypted data in the form of non-fungible token (NFT) for display thereon. The transparent data display window apparatus comprising: a transparent data display encased by a border; and a controller device integrally connected with the transparent data display; wherein the controller device further comprises at least one processor and at least one memory storing instructions that when executed cause the at least one processor to perform operations comprising: (i) receiving a plurality of encrypted NFT data; (ii) displaying, on the transparent data display, the encrypted NFT data received; and (iii) generating and embedding a unique time code within the transparent data display specific to a current display of the encrypted NFT data on the transparent data display, wherein the embedded unique time code is readable and recordable at a particular time by a user device proximate to the transparent data display window and useful for continuing the current display of the encrypted NFT data from the particular time of the recording of the embedded unique time code by the user device proximate to the transparent data display on a display device other than the transparent data display.

In a second aspect, a method is provided that facilitates the processing of encrypted NFT data by and through one or more transparent data display windows. The method comprising operations for: (i) receiving, by at least one transparent data display window of a plurality of transparent data display windows, a plurality of encrypted NFT data; (ii) displaying, on the at least one transparent data display window, the encrypted NFT data received; (iii) reading and recording, by at least one user device proximate to the at least one transparent data display window, a unique time code embedded therein specific to the current display of the encrypted NFT data received on the at least one transparent data display window; (iv) receiving, from the at least one user device, the recorded unique time code by at least another one transparent data display window of the plurality of transparent data display window; and (v) displaying, by the at least another one transparent data display window, using the recorded unique time code received, the current display of the encrypted NFT data from the exact time of the recording of the embedded unique time code from the at least one transparent data window display.

In a third aspect, a transparent data display window system is provided for the processing and displaying of encrypted NFT data by and through a plurality of transparent data display windows. The transparent data display window system comprising a plurality of transparent data window displays, wherein each transparent data window display comprises a transparent data display encased by a polycarbonate border and a controller device integrally connected therewith wherein the controller device further comprises at least one processor and at least one memory storing instructions that when executed cause the at least one processor to perform operations comprising: (i) receiving, by at least one transparent data display window of a plurality of transparent data display windows, a plurality of encrypted NFT data; (ii) displaying, on the at least one transparent data display window, the encrypted NFT data received; and (iii) providing a unique time code embedded within the at least one transparent data display window specific to the current display of the encrypted NFT data received on the at least one transparent data display window, wherein the recorded unique time code is readable by at least one user device proximate to the at least another one transparent data display window of the plurality of transparent data display windows and useful for displaying, by at least another one transparent data display window, using the recorded unique time code received, the current display of the encrypted NFT data from the exact time of the recording of the embedded unique time code from the at least one transparent data window display.

In a fourth aspect, a transparent data display window application (alternatively referred to herein as an "app") is provided for executing, on a transparent data display window apparatus, a transparent data display window system, a user device and/or other hardware, comprising operations for: (i) receiving, by at least one transparent data display window of a plurality of transparent data display windows, a plurality of encrypted NFT data; (ii) displaying, on the at least one transparent data display window, the encrypted NFT data received; and (iii) providing a unique time code embedded within the at least one transparent data display window specific to the current display of the encrypted NFT data received on the at least one transparent data display window, wherein the recorded unique time code is readable by at least one user device proximate to the at least another one transparent data display window of the plurality of transparent data display windows and useful for displaying, by at least another one transparent data display window, using the recorded unique time code received, the current display of the encrypted NFT data from the exact time of the recording of the unique time code from the at least one transparent data window display.

In fifth aspect, a user device is provided for use with the transparent data display window(s) and/or the transparent data display window system. The user device comprising at least a code reader, a display, a processor, and a memory storing instructions that when executed cause the at least one processor to perform operations comprising: (i) establishing a communication session with at least one transparent data display window; (ii) receiving, by at least one transparent data display window of a plurality of transparent data display windows, a plurality of encrypted NFT data; (iii) displaying, on the at least one transparent data display window, the encrypted NFT data received; and (iv) providing a unique time code embedded within the at least one transparent data display window specific to the current display of the encrypted NFT data received on the at least one transparent data display window, wherein the recorded unique time code is readable by at least one user device proximate to the at least another one transparent data display window of the plurality of transparent data display windows and useful for displaying, by at least another one transparent data display window, using the recorded unique time code received, the current display of the encrypted NFT data from the exact time of the recording of the embedded unique time code from the at least one transparent data window display.

In a further aspect, the border encasing the transparent data display window comprises a polycarbonate material. In a further aspect, the border encasing comprises a transparent (i.e., optically clear) aluminum material.

In a further aspect, the transparent data display window comprises a green screen overlay for background presentation and/or content creation.

In a further aspect, the transparent data display window comprises a privacy tint overlay thereby providing an opaque window feature.

In a further aspect, each encrypted NFT represents a defined time interval of the content displayed on the transparent data display window. In a further aspect, the defined time interval is one (1) second.

In a further aspect, each encrypted NFT is a particular one block in a plurality of blocks of a distributed ledger technology (DLT). In a further aspect, the DLT is a blockchain.

In a further aspect, the transparent data display window system is integrated with a vehicle. In a further aspect, the vehicle comprises at least one panoramic camera that is communicatively coupled with at least one transparent data display window of the transparent data display window system and used for to produce, receive and/or alter content represented by the encrypted NFT data.

In a further aspect, the transparent data display window system is integrated with a physical structure (e.g., a building).

In a further aspect, the transparent data display window apparatus comprises at least one quantum processor.

In a further aspect, the transparent data display window apparatus comprises a user selection feature directed to adding, choosing, and/or terminating a specific validator node. In a further aspect such user selection features actions may be made by a system administrator and/or an individual user. In a further aspect, the user selection feature is a display icon or button.

In a further aspect, the transparent data display window apparatus is configured to operate with one or more auditory devices and/or one or more haptic devices for providing sound and/or haptic (e.g., vibration) experiences to a user(s) thereof.

In a further aspect, the transparent data display window apparatus delivers an enhanced immersive user experience.

In a further aspect, the user device comprises a digital wallet for storing a security code that is used for controlling secure access to the encrypted NFT data.

In a further aspect, the user device is configured to operate with a cold wallet for storing a security code that is used for controlling secure access to the encrypted NFT data.

In a further aspect, the user device may be used to produce, receive and/or alter content represented by the encrypted NFT data.

In a further aspect, the embedded unique time code is a quick response (QR) code.

In a further aspect, the user device comprises a QR code reader.

In another aspect, the transparent data display window apparatus and the transparent data display window system are compliant with ISO 20022 standard for electronic data interchange between financial institutions as promulgated by the International Organization for Standardization (ISO).

In another aspect, the encrypted NFT data is compliant with the Oracle Access Management Security Token Service.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
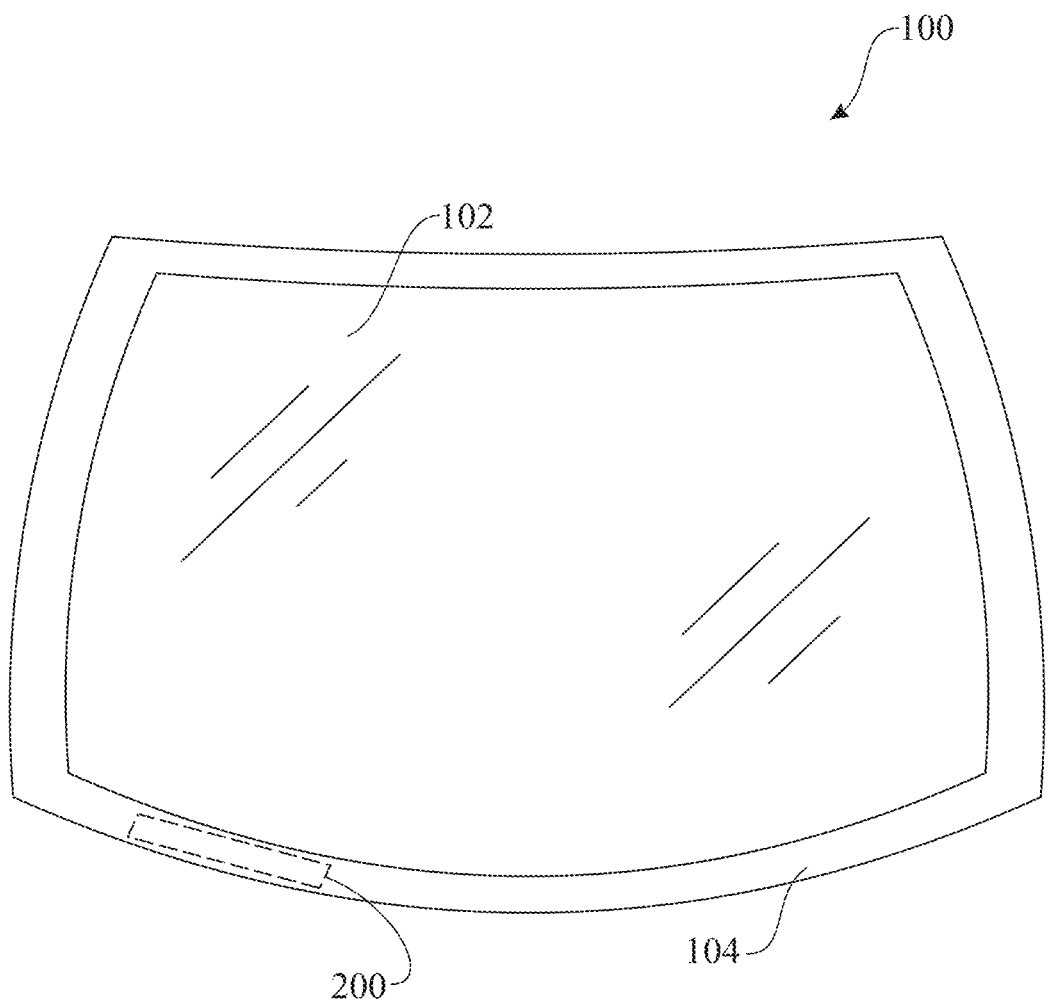
FIG. 1 presents an illustrative transparent data display window apparatus configured for use with a transportation medium in accordance with an embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the figures herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a transparent data display window apparatus, system, and method that receive and process encrypted data in the form of a non-fungible token (NFT) for display thereon. The transparent data display window apparatus comprising at least a transparent data display encased by a border; and a controller device integrally connected with the transparent data display; wherein the controller device further comprises at least one processor and at least one memory storing instructions that when executed cause the at least one processor to perform operations comprising: receiving a plurality of encrypted NFT data; displaying, on the transparent data display, the encrypted NFT data received; and generating and embedding a unique time code within the transparent data display specific to a current display of the encrypted NFT data on the transparent data display, wherein the embedded unique time code is readable and recordable at a particular time by a user device proximate to the transparent data display window and useful for continuing the current display of the encrypted NFT data from the particular time of the recording of the embedded unique time code by the user device proximate to the transparent data display on a display device other than the transparent data display. Importantly, the transparent data display windows, system, and method of the disclosed embodiments provide advantageous improvements in practical applications including, but not limited to, virtual reality systems, apparatus, and methods, vehicular applications, transportation mediums, and transparent digital display systems. Further, the disclosed embodiments solve at least a visual reality problem with respect to users engaging in an immersive virtual reality experiences without the need for any special glasses and/or or headgear, and also provide for the extended play of the virtual reality immersive experience from one transparent data window display to one or more other transparent data window display without the user losing their place in the virtual reality immersive experience. That is, the display and the engagement by the user on the one or more other transparent data display windows continues from the exact time that user left the viewing of the virtual reality immersive experience on the initial transparent data display window.

Turning our attention to FIG. 1 an illustrative transparent data display window apparatus 100 configured for transportation medium use in accordance with an embodiment. More particularly, the transparent data display window apparatus 100 comprises transparent data display 102 encased by border 104. In an embodiment, the border 104 encasing the transparent data display 102 is made from a polycarbonate material. In a further aspect, the border encasing comprises a transparent (i.e., optically clear) aluminum material such as aluminum oxynitride that may increase the durability of the transparent data display window apparatus 100 in various applications. In an embodiment, transparent data display 102 may be one of the so-called Lumineq® displays as commercially available from Beneq Products Oy. Further, illustratively, a controller device 200 is embedded within the border 104. Of course, this is only one of many possible configuration for mounting and/or communicatively coupling the controller device 200 to the transparent data display window apparatus 100. For example, the controller device 200 may also be mounted external to the border and communicatively coupled to the transparent data display 102. Illustratively, the transportation medium use(s) may be directed to any type of transportation medium into which the transparent data display window may be installed including, but not limited to, cars (including smart cars), trucks, vans, recreational vehicles (RV), buses, trains, jeeps, and airplanes, to name just a few.

Figure 2:
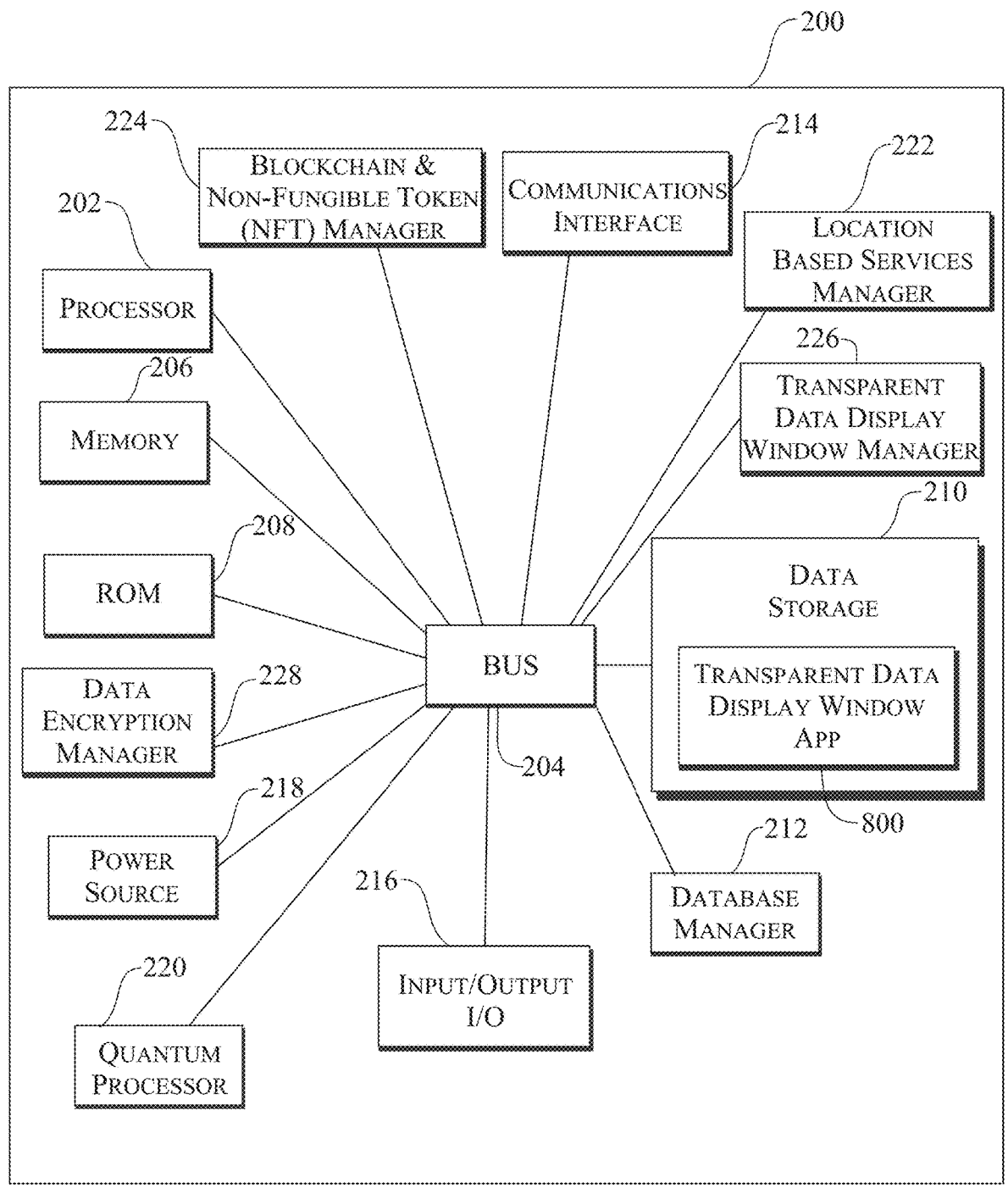
FIG. 2 presents an illustrative controller device configured for use with a transparent data display window apparatus in accordance with an embodiment.

Turning our attention to FIG. 2 an illustrative controller device 200 configured for use with a transparent data display window (e.g., transparent data display window apparatus 100) in accordance with an embodiment. As shown, the controller device 200 comprises processor 202 for executing program code (e.g., transparent data display window app 800, see FIG. 8) and communications interface 214 for managing communications to and from the controller device 200, memory 206 and/or read-only memory (ROM) 208 for storing program code and data, and power source 218 for powering the controller device 200. The memory 206 is coupled to the bus 204 for storing computer-readable instructions to be executed by the processor 200 (e.g., execution of the transparent data display window app 800). Database manager 212 is used to manage the delivery and storage of content, data, and other information from and to the transparent data display window apparatus 100.

As will be discussed in greater detail herein below, the transparent data display window app 800, as stored in data storage 210, when executed by the processor 202 will enable, in an embodiment, the execution of operations comprising: (i) receiving a plurality of encrypted NFT data; (ii) displaying, on the transparent data display, the encrypted NFT data received; and (iii) generating and embedding a unique time code within the transparent data display specific to a current display of the encrypted NFT data on the transparent data display, wherein the embedded unique time code is readable and recordable at a particular time by a user device proximate to the transparent data display window and useful for continuing the current display of the encrypted NFT data from the particular time of the recording of the embedded unique time code by the user device proximate to the transparent data display on a display device other than the transparent data display (i.e., another display device that may also be another transparent data display window apparatus). The controller device 200 may also comprise quantum processor(s) 220 providing for quantum processing including, but not limited to, human speech recognition that facilitates content creation using a transparent data display window. In an embodiment, the quantum processor 220 is configured with the controller device 200 of the transparent data display window that serves as a master window controller (see, e.g., FIG. 5 and as further discussed herein below). The blockchain and NFT manager 224, transparent data display window manager 226, and data encryption manager 228 facilitate the processing and management of the encrypted NFT tokens across one or more blockchains, as will be further discussed herein below.

Location-based service manager 222 facilitates the delivery of location-based services (e.g., Global Positioning System (GPS) tracking) thereby allowing the controller device 200 to register the exact location of the user of a user device (e.g., user device 900, see FIG. 9), for example, as the user roams from one location to another location such that the virtual reality processing and services hereunder may be tailored to a current location and/or the needs of the user may change based on their current location. For example, the user may be in a vehicle at one point in time and then transition to an indoor position within a building at some later point in time.

In an embodiment, the virtual reality and transparent data display window processing provided through the execution of the transparent data display window app 800 may also include a web-based delivery platform and/or accessing and interfacing any number of websites for procuring information and data that can be used in the controller device 200. The term "website" in the context herein is used in a conventional and broadest sense and is located on at least one server containing web pages stored thereon and is operational in a 24-hour/7-day typical fashion.

The communications interface 214 is used to facilitate communications across any type of well-known communications links. This may take the form, for example, of a wide area network connection that communicatively couples the controller device 200 with the access points which may be a cellular communications service. Similarly, communications managed by the communications interface 214 may take the form, for example, of a local Wi-Fi network interface or Ethernet interface the communicatively couples the controller device 200 with the well-known Internet and/or a local area network (LAN), for example, and ultimately one or more transparent data display windows (e.g., the transparent data display window apparatus 100). In the instant embodiment, the transparent data display window app 800 and/or the communications interface 214 may include a communications stack for facilitating communications over the respective communications link. The controller device 200 may also include one or more input/output devices 216 that enable user interaction with the user device 600 such as a camera, display, keyboard, mouse, speakers, microphone, buttons, etc. The input/output devices 216 may include peripherals, such as an NFC device (e.g., NFC reader), camera, printer, scanner (e.g., QR-code scanner), touchscreen display, etc.

Figure 3:
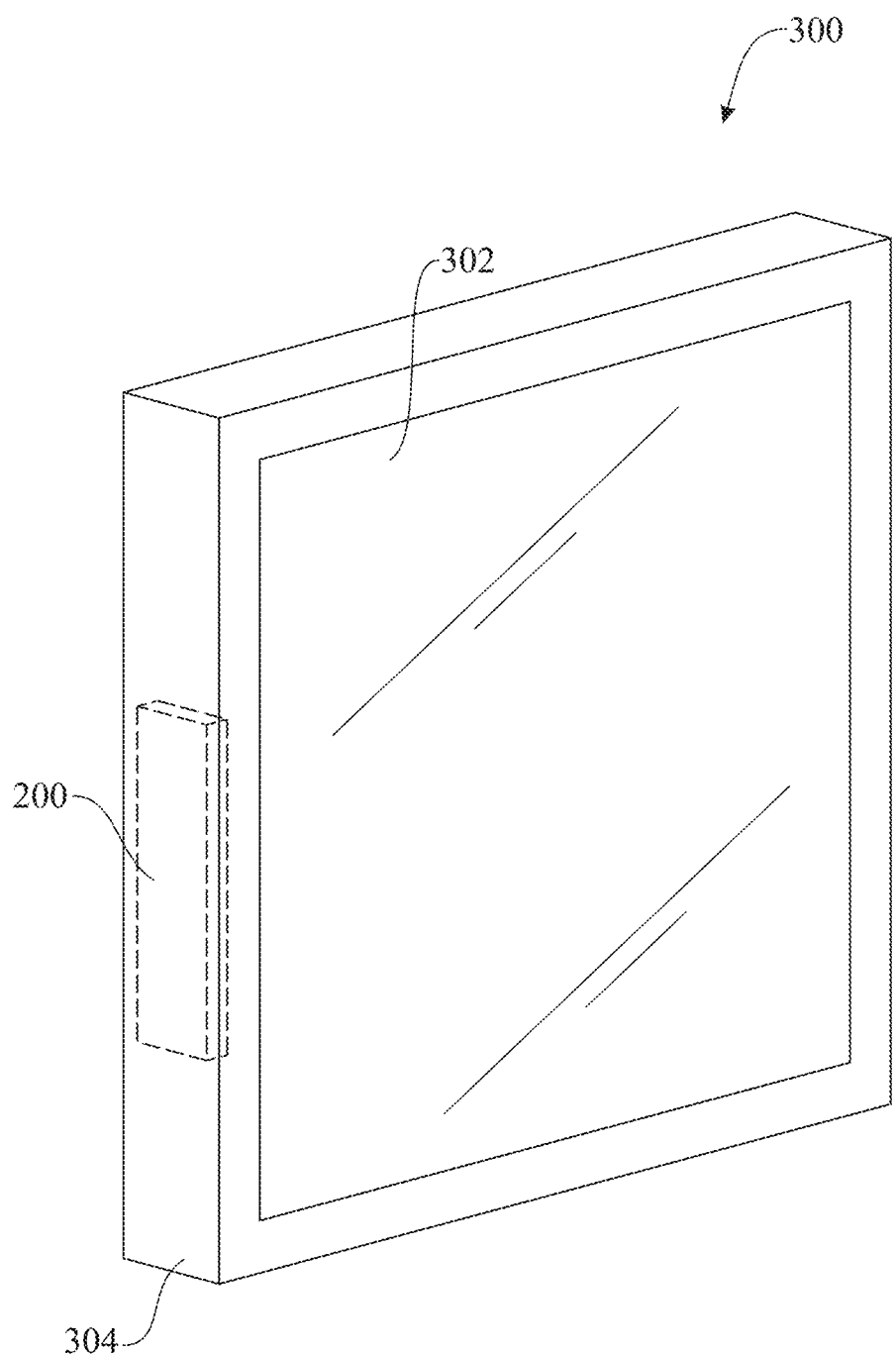
FIG. 3 presents an illustrative transparent data display window apparatus configured for physical structure/infrastructure use in accordance with an embodiment.

FIG. 3 presents an illustrative transparent data display window apparatus 300 configured for physical structure/ infrastructure use in accordance with an embodiment. Illustratively, such physical structure/infrastructure use(s) may be directed to any type of physical structure/infrastructure into which the transparent data display window may be installed including, but not limited, buildings, homes (including smart homes), shopping centers and malls, to name just a few. Further, the transparent data display window apparatus 300 comprises transparent data display 302 encased by border 304. In an embodiment, the border 304 encasing the transparent data display window is made from a polycarbonate material. Further, illustratively, the controller device 200 is embedded within the border 304. Of course, this is only one of many possible configuration for mounting and/or communicatively coupling the controller device 200 to the transparent data display window apparatus 300. For example, the controller device 200 may also be mounted external to the border and communicatively coupled to the transparent data display 302. In further aspects, the transparent data display window apparatus 200 and/or the transparent data display window apparatus 300 further comprises a green screen overlay for providing a background presentation feature thereto and/or content creation and/or a privacy tint overlay thereby providing an opaque window feature thereto.

Figure 4:
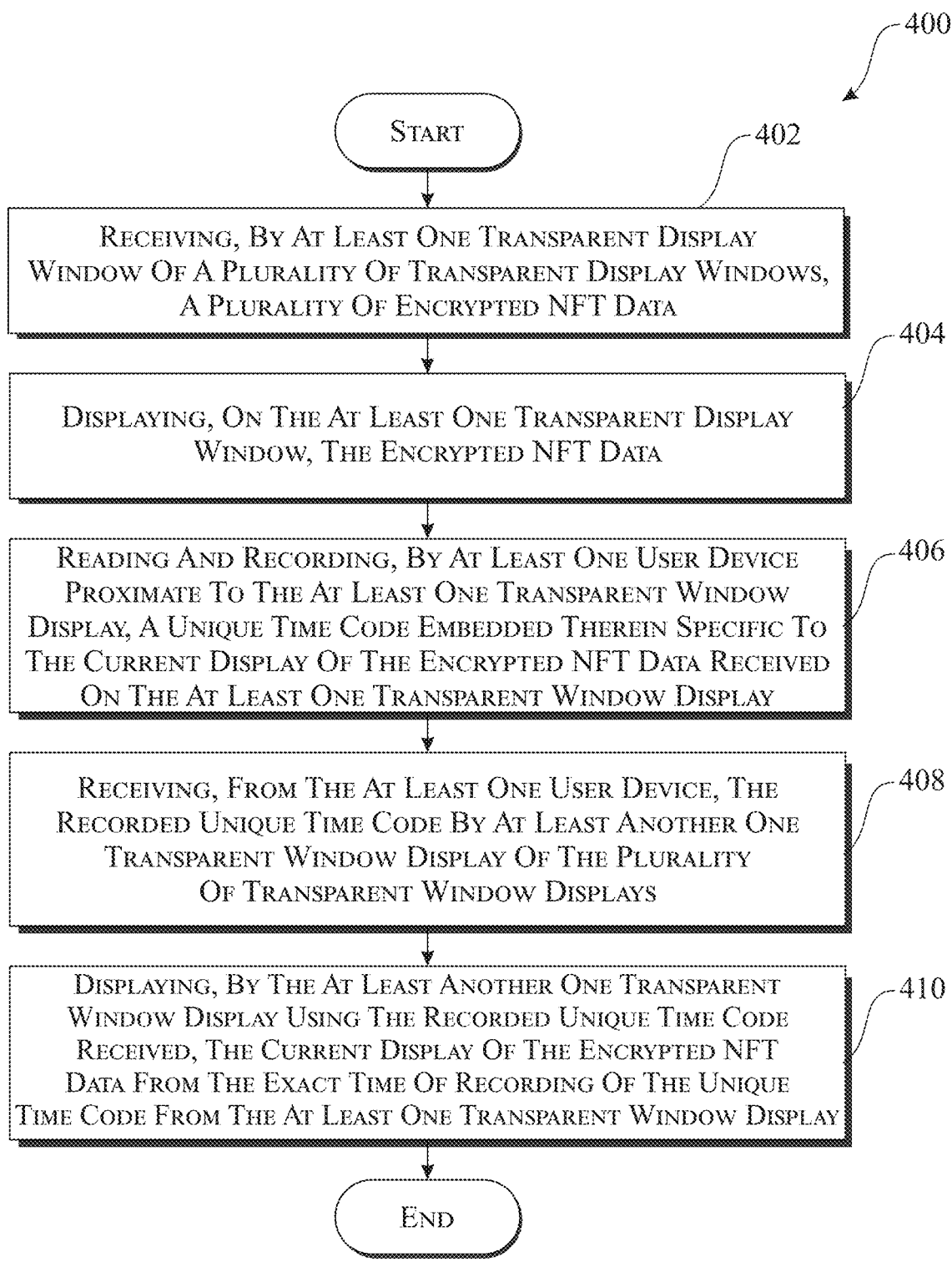
FIG. 4 presents a flowchart of illustrative operations for a transparent data display window in accordance with an embodiment.

Turning our attention to FIG. 4, a flowchart of illustrative operations 400 for a transparent data display window in accordance with an embodiment. More particularly, at step 402, receiving, by at least one transparent data display window of a plurality of transparent data display windows, a plurality of encrypted NFT data, and at step 404, displaying, on the at least one transparent data display window, the encrypted NFT data received. At step 406, reading and recording, by at least one user device proximate to the at least one transparent data display window, a unique time code embedded therein specific to the current display of the encrypted NFT data received on the at least one transparent data display window. Then, at step 408, receiving, from the at least one device, the recorded unique time code by at least another one transparent data display window of the plurality of transparent data display window. At step 410, displaying, by the at least another one transparent data display window, using the recorded unique time code received, the current display of the encrypted NFT data from the exact time of the recording of the unique time code from the at least one transparent data window display.

Figure 5:
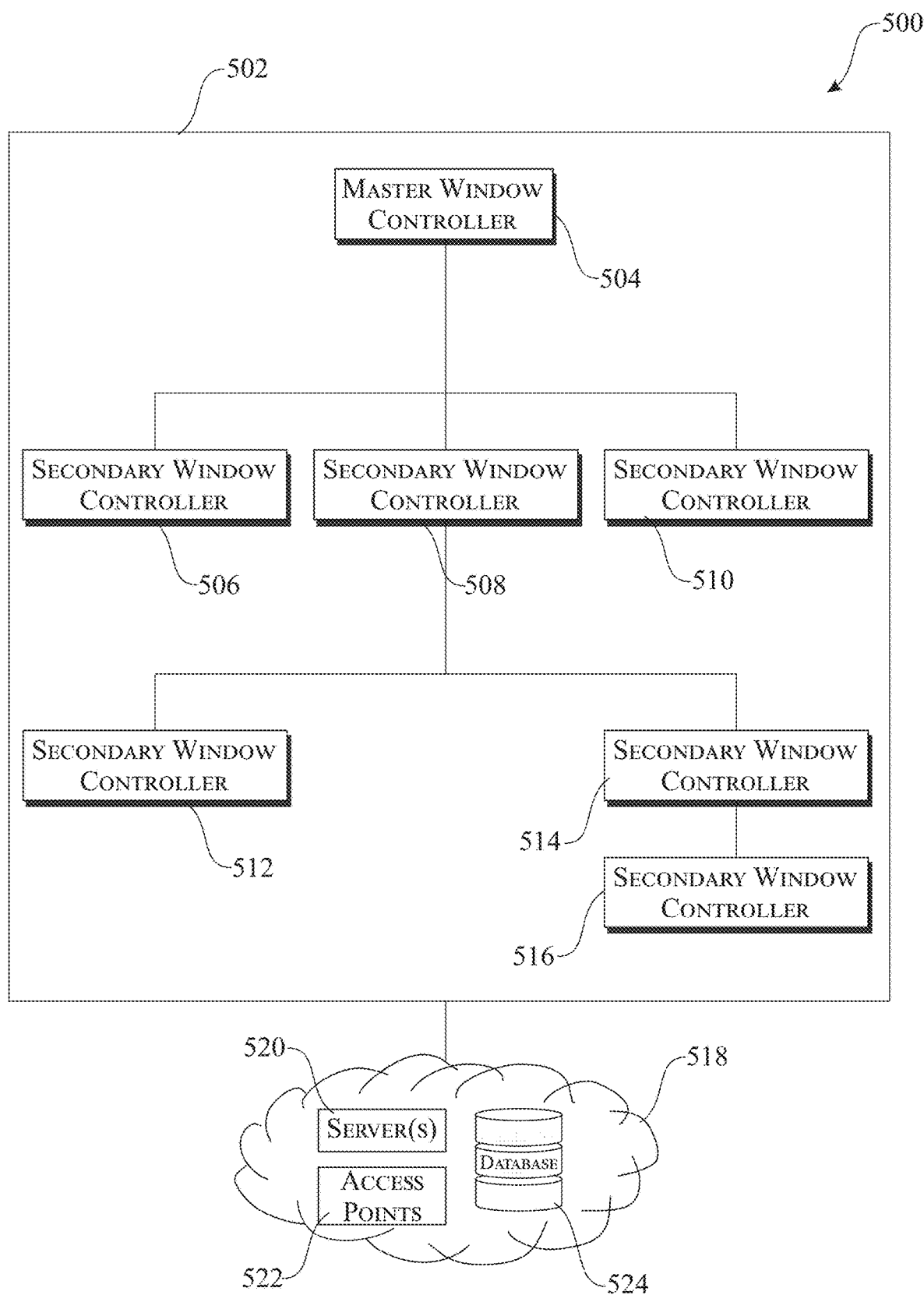
FIG. 5 presents an illustrative network provided by a transparent data display window system in accordance with an embodiment.

FIG. 5 presents an illustrative network 500 provided by a transparent data display window system 502 comprising a plurality of transparent data display windows (e.g., the transparent data display window apparatus 100 and/or the transparent data display window apparatus 300), wherein each transparent data window display comprises a transparent data display encased, illustratively, by a polycarbonate border and a controller device (i.e., the controller device 200) integrally connected therewith wherein the controller device further comprises at least one processor and at least one memory storing instructions that when executed cause the at least one processor to perform, for example, the aforementioned operations 400 of FIG. 4. As shown, the transparent data display window system 502 comprises the plurality of transparent data display windows such that each of their respective controllers are configured in a hierarchical network configuration comprising a master window controller 504 and a plurality of secondary window controllers (i.e., secondary window controllers 506, 508, 510, 512, 514, and 516, respectively). In accordance with an embodiment each master window controller 504 and the plurality of secondary window controllers (i.e., secondary window controllers 506, 508, 510, 512, 514, and 516, respectively) have a unique network address (e.g., an IP address). In this way, the master window controller 504 and the plurality of secondary window controllers, and their respective transparent data display window, can operate in either an independent fashion or in a cooperative fashion using their respective IP address. The illustrative network 500 provided by the transparent data display window system 502 is communicatively coupled (e.g., across a wireless communications link) to a cloud network 518 comprising server(s) 520, access point(s) 522, and database(s) 524). Thus, the virtual reality processing enabled by the transparent data display window system 502 may be transmitted and communicated over any number of networks, transparent data displays windows and/or individual user devices.

As detailed above, the disclosed embodiments herein, employ encrypted data in the form of non-fungible tokens for display on the transparent data display window. As will be appreciated, an NFT is a unit of data stored using digital ledger technology (DLT) (e.g., a blockchain) that certifies a digital asset to be unique and therefore not interchangeable. An NFT is a digital asset that can be used to represent items such as photos, videos, audio, and other types of digital files. Currently, NFTs are bought and sold online, frequently with cryptocurrency, and they are generally encoded with the same underlying software as many cryptocurrencies. Access to any copy of the original file, however, is not restricted to the owner of the NFT. While copies of these digital items are available for anyone to obtain, NFTs are tracked on a blockchain to provide the owner with a proof of ownership that is separate from copyright. That is, an NFT is a unit of data stored on the DLT (e.g., a blockchain) which can be sold and traded. The NFT can be associated with a particular digital or physical asset (such as a file or a physical object) and a license to use the asset for a specified purpose. NFTs (and the associated license to use, copy or display the underlying asset) can be traded and sold on digital markets. In this way, NFTs function like cryptographic tokens, but, unlike other tokens (e.g., Bitcoin), NFTs are not mutually interchangeable, hence not fungible. Thus, each NFT may represent a different underlying asset and thus have a different value. NFTs are created, for example, when blockchains string records of cryptographic hash a set of characters identifying a set of data onto previous records thereby creating a chain of identifiable data blocks. This cryptographic transaction process ensures the authentication of each digital file by providing a digital signature that is used to track NFT ownership. An NFT is a unique digital token, with most using the well-known Ethereum blockchain to digitally record transactions. Again, the NFT is not a cryptocurrency like Bitcoin or Ethereum, because those are fungible (i.e., exchangeable for another Bitcoin or cash). However, NFTs are recorded in a digital ledger in the same way as cryptocurrency, so there is a listing of who owns each one.

In this way, blockchains act as a decentralized system for recording and documenting transactions that involve a specific NFT and/or a plurality of NFTs. In essence, as noted previously, a blockchain is a transaction ledger that maintains identical copies across each computer of a member network and the fact that the ledger is distributed across part of the network facilitates the security of blockchain. A blockchain relies on three important components that are private key technology, a distributed network that includes a shared ledger and an accounting means for the transactions and records across the network. A blockchain is a list of records (called blocks) that are cryptographically linked together such that each block contains a cryptographic hash of the previous block, a timestamp, and transaction data. Thus, a blockchain is highly resistant to modification due to the design feature that once recorded the data in any given block cannot be altered without alteration of all subsequent blocks. In many applications, the constructed distributed ledger is managed by a peer-to-peer network that allows participants to verify and audit transactions in an efficient manner. By combining the use of cryptographic keys with a distributed network, blockchain expands the type and number of digital transaction possibilities.

There are different blockchain platforms that can be utilized for exchanging NFTs, and Ethereum currently is the most common platform. Ethereum is a public blockchain platform that can support, among other things, NFTs and advanced and customized smart contracts with the help of Turing-complete programming language. Another blockchain platform that is increasingly gaining traction is the Hyperledger Fabric (also referred to as "Fabric") as established by the Linux Foundation (see, e.g., LFS272: Hyperledger Fabric Administration, version 8.24, dated May 26, 2021) with a major focus on enterprise uses that require participants to be identified/identifiable, permissioned networks, high transaction throughput performance, low latency of transaction confirmation and privacy and confidentiality of transactions and data pertaining to business transactions. Fabric is the first distributed ledger platform to support smart contracts authored in general-purpose programming languages such as Java, rather than domain-specific languages (DSL). As such, enterprises can more easily develop smart contracts without the need to learn a specific/new programming language. The Fabric platform is also permissioned in that, unlike a public permissionless network, the participants are known to each other, rather than anonymous and therefore fully untrusted. This means that while the participants may not fully trust one another (e.g., if they are adverse parties or competitors) a network can be operated under a governance model that is constructed as a function of whatever trust does exist between participants, such as a legal framework. These features make Fabric one of the better performing platforms that are currently available both in terms of transaction processing and transaction confirmation latency. Further, this platform enables privacy and confidentiality of transactions and smart contracts that implement them.

Figure 6:
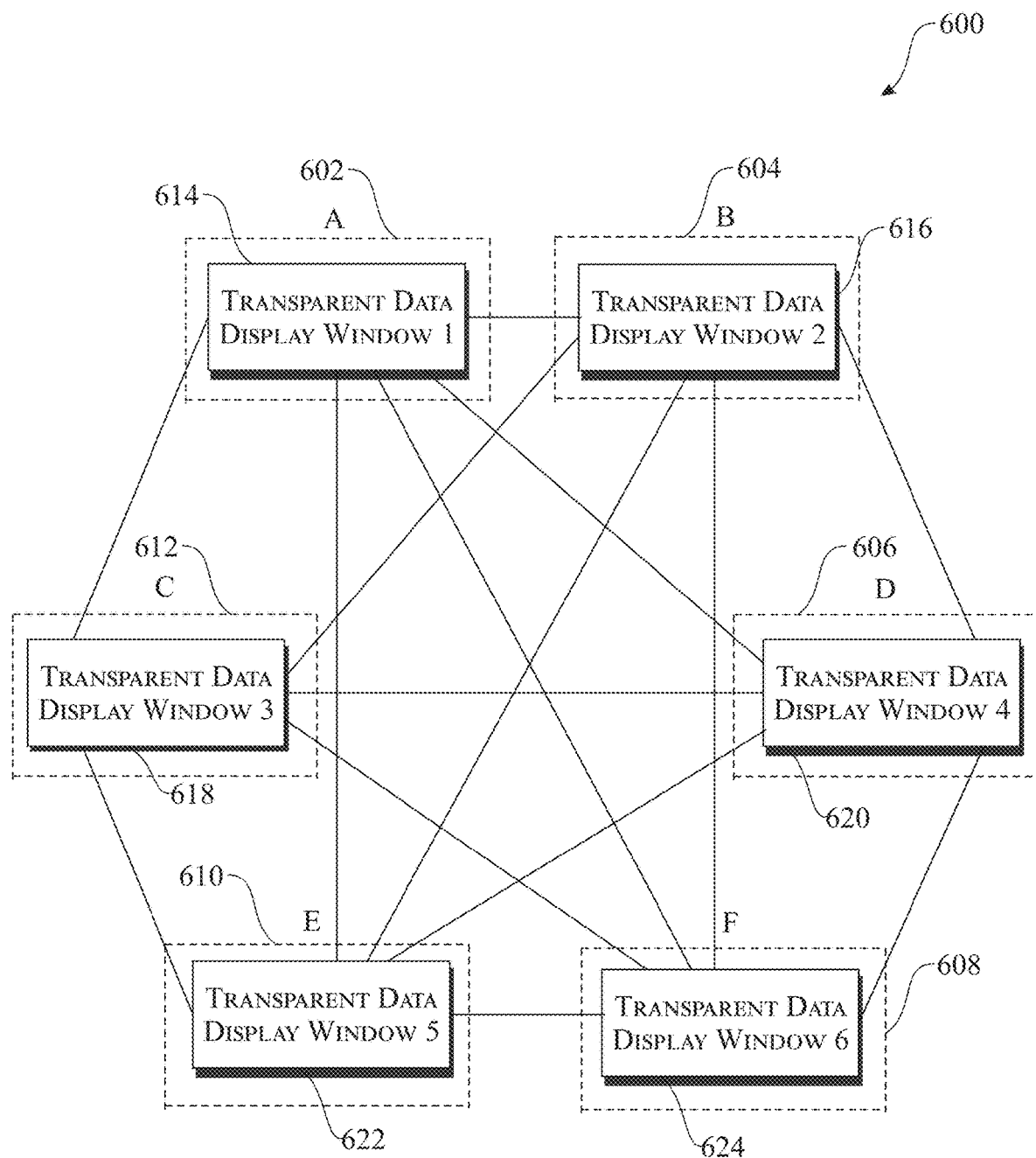
FIG. 6 presents an illustrative mesh network between multiple transparent data display windows for exchanging and processing encrypted NFT data in accordance with an embodiment.

Turning our attention to FIG. 6, an illustrative mesh network 600 is presented between multiple transparent data display windows for exchanging and processing encrypted NFT data in accordance with an embodiment. As shown, the illustrative mesh network 600 employs a peer-to-peer configuration that includes six (6) nodes between a plurality of transparent data display windows. In particular, node A 602 associated with transparent data display window 1 614, node B 604 associated with transparent data display window 2 616, node C 612 associated with transparent data display window 3 618, node D 606 associated with transparent data display window 4 620, node E 610 associated with transparent data display window 5 622, and node F 608 associated with transparent data display window 6 624. The illustrative mesh network 600 is configured such that each node can communicate with and relay data (e.g., the encrypted NFT data) to each of the other nodes. In this way, the various transparent data display windows, and other user devices (e.g., the user device 900) to communicate with each other across the mesh network 600 in performing the various operations and/or actions required by the blockchain-based processing of NFT encrypted data herein.

As such, in the framework of the principles of the disclosed embodiments, a blockchain is a public ledger of all transactions that have been executed in a particular context (e.g., the exchange of encrypted NFT tokens by the transparent data display windows hereunder). The blockchain constantly enlarges as completed blocks are added thereto as new transactions are addressed. Typically, blocks are added to the blockchain (see, e.g., blockchain 704 in FIG. 7) in a linear, chronological order by the various transparent data display windows and/or the user devices involved in the virtual reality applications executing the blockchain protocol, for example, in a peer-to-peer network. The peer-to-peer network is essentially a plurality of interconnected nodes (e.g., node A 602, node B 604, node C 612, node D 606, node E 610, and node F 608) with each node associated with a particular transparent data display window serving as a client to validate and relay transactions (e.g., virtual reality applications hereunder). A copy of the blockchain is maintained by each node which is automatically downloaded to the node upon joining the blockchain. In turn, the blockchain protocol provides a secure and reliable mechanism for updating and distributing copies of the blockchain across the interconnected nodes. In an embodiment, the transparent data display window(s) and the transparent data display window system herein are compliant with ISO 20022 standard for electronic data interchange between financial institutions as promulgated by the International Organization for Standardization (ISO). In a further embodiment, the encrypted NFT data is compliant with the Oracle Access Management Security Token Service.

Figure 7:
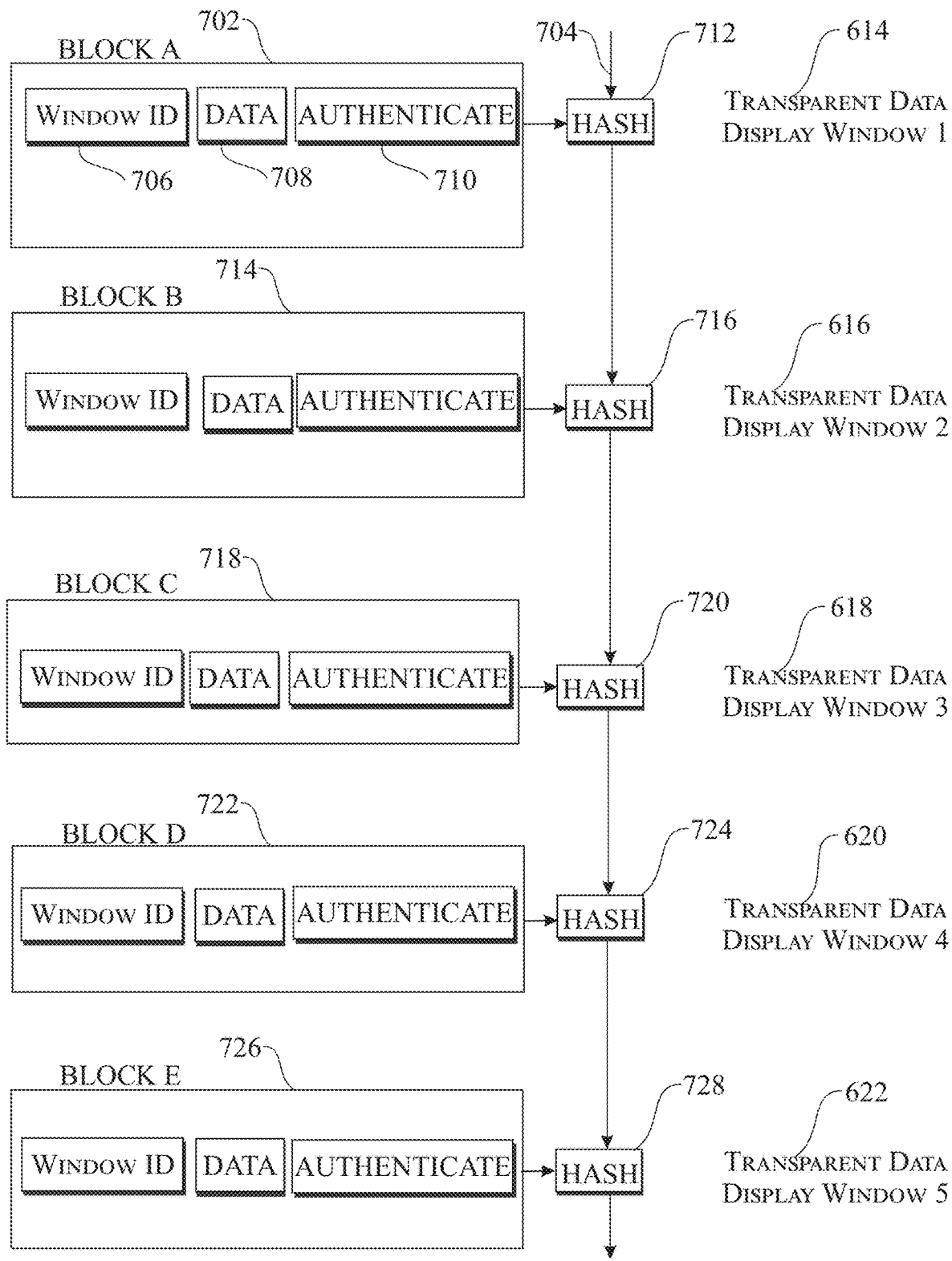
FIG. 7 presents an illustrative blockchain interaction between the multiple transparent data display windows of FIG. 6 exchanging encrypted NFT data in accordance with an embodiment.

Turning our attention to FIG. 7, an illustrative transparent data display window blockchain interaction is shown in accordance with an embodiment. In the case of the transparent data display window and encrypted NFT data processing embodiments hereunder, blockchain 704 is distributed among multiple transparent data display windows associated with multiple users. For example, as shown, transparent data display windows 614, 616, 618, 620, and 622, respectively, as shown in FIG. 6. In the example shown, block A 702 is added to the blockchain 704 and may contain window ID 706 of transparent data display window 614 or an address/identification associated therewith, and may also contain data 708 (e.g., relevant encrypted NFT data). Also, the block A 702 may contain an authentication portion 710 that may be used to set restrictions of various levels on the data 708 and/or the party ID 706. For example, the party ID 706 and the data 708 may be set such that they are not accessible to one or more other users.

As the block 702 is generated, the block 702 is hashed 712 into the previous blockchain 704 resulting in an updated blockchain 704 which continues to be distributed among the various transparent data display windows and other user devices. The blockchain protocol may include a so-called proof of work scheme that is based on a cryptographic hash function (CHF), for example, the secure hash algorithm 256 (SHA-256). Generally, the CHF receives information as input and provides a hash value output, wherein the hash value has a predetermined length. For example, SHA-256 provides a 256-bit (32-byte, 64 character) hash value output. The blockchain may also require multiple information pieces as input to the CHF. The input, for example, may include a reference to the previous (i.e., most recent) block in the blockchain, details of the transaction(s) that are to be included in the to-be-created block, and a nonce value (e.g., a random number used a single time). Further, the blockchain protocol provides a threshold hash to qualify a block to be added to the blockchain. For example, the threshold hash may include a predefined number of zeros (0's) that the hash value must have at the start, and the higher the number the more effort that is required to arrive at the qualifying hash. As such, the other transparent data display windows receive the updated blockchain 704 containing the block 702.

Illustratively, transparent data display window 616 receives the blockchain 604 and generates block B 714 and stores the respective data in the blockchain 704. Similar to block A 702, the block B 714 may store the respective transaction data of the transparent data display window 616, an ID of the party, or an address/identification of a user device, and an authentication portion. As the block B 714 is generated the block is hashed 716 into the previous blockchain 704 resulting in an updated blockchain which is distributed among the transparent data display windows and/or respective user devices of the various parties engaged with the transparent data display windows. In turn, the transparent data display window 618 may generate block C 718 in their transaction processing which is subsequently hashed 720 into the blockchain 704 which again results in an updated blockchain that is distributed among the transparent data display windows and/or respective user devices of the various parties engaged with the transparent data display windows. Similarly, transparent data display window 620 and transparent data display window 622 generate block D 722 and block E 726, respectively, that are hashed (i.e., hash 724 and hash 728) into the blockchain 704 which results in a further updated blockchain that is distributed to the various parties engaged with the transparent data display windows.

As noted previously, one or more user devices may be used to engaged with one or more transparent data display windows to enable the immersive virtual reality processing of the disclosed embodiments. More specifically, one important aspect of the disclosed embodiments is directed to a user engaging in virtual reality experiences without the need for any special glasses and/or or headgear, and also provide for the extended and continuous play of the virtual reality experience from one transparent data window display to one or more other transparent data window display without the user losing their place in the virtual reality experience at any particular time. That is, the display and the engagement by the user on the one or more other transparent data display windows continues from the exact time that the user left (or ceased) the viewing (or executing) of the virtual reality experience on the initial transparent data display window. In an embodiment, a unique time code is embedded within the at least one transparent data display window specific to a current display of the encrypted NFT data received on at least one transparent data display window, wherein the recorded unique time code is readable by the user device when proximate to the at least one transparent data display window. Illustratively, the user points their user device (e.g., a smartphone) at the subject transparent data display window and records the unique time code (e.g., using a QR code scanning function) and then moves to another location having one or more other transparent data display windows such that the previously recorded unique time code provided and transmitted to the one or more transparent data display windows via their respective controller device 200. The respective controller device 200 then, using the received embedded unique time code, enables the displaying by at least another one transparent data display window of the current display of the encrypted NFT data from the exact time of the recording of the unique embedded time code from the at least one transparent data window display at the time when the user ceased their engagement therewith. These aspects of the disclosed embodiments will be further detailed herein below in the discussion directed to FIGS. 10, 11, and 12.

Figure 8:
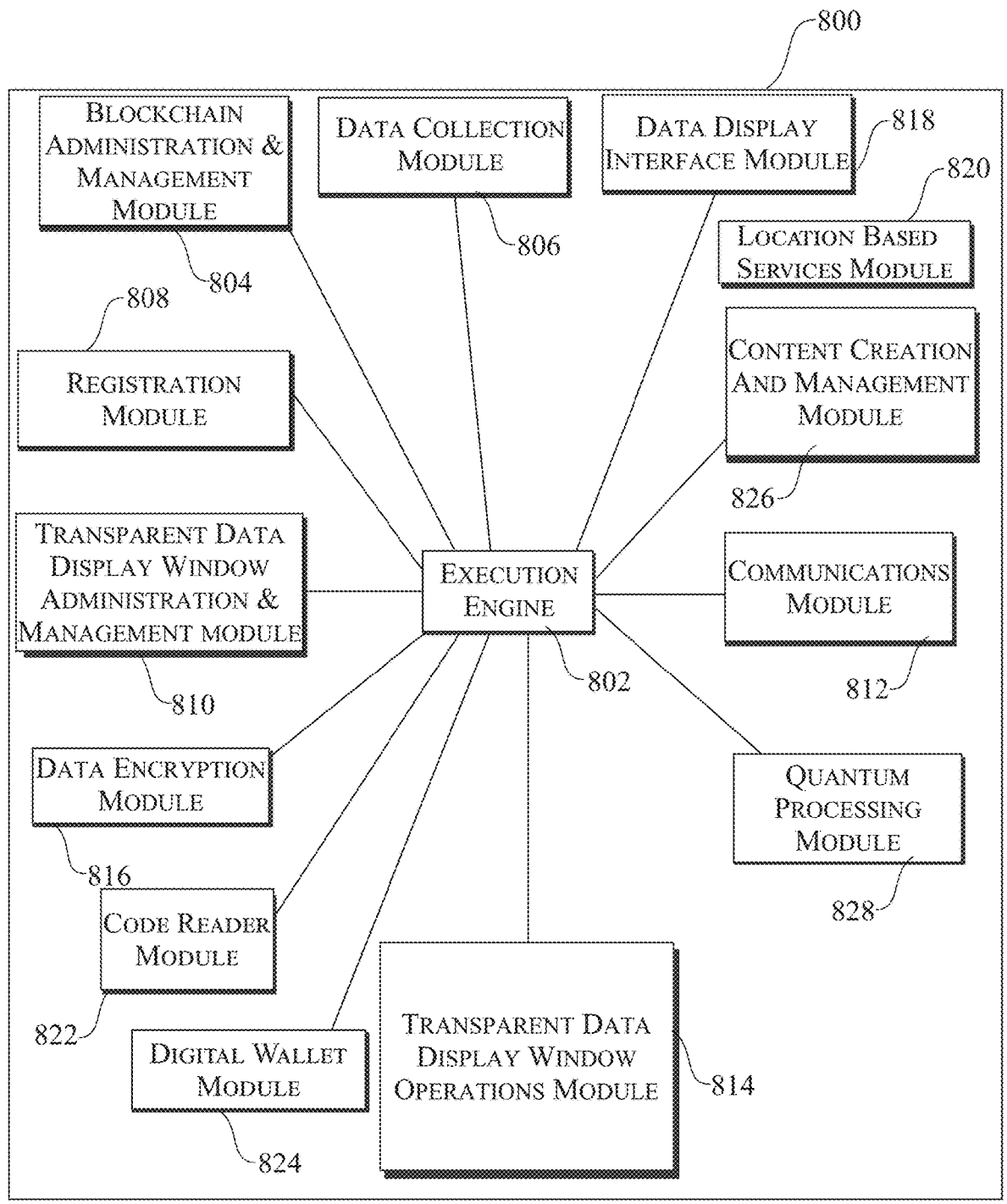
FIG. 8 presents an illustrative architecture for a transparent data display window app in accordance with an embodiment.

Turning our attention to FIG. 8, an illustrative architecture for the operation of the transparent data display window app 800 is presented in accordance with an embodiment. As will be appreciated, the architecture may be used in conjunction with the cloud network 518, the controller device 200, and/or the user device 900 for launching and executing the transparent data display window app 800 and its associated operations. As shown, the architecture for the operations of the transparent data display window app 800 provides several interfaces and engines used to perform a variety of functions such as the collection, aggregation, manipulation, processing, analyzing, verification, authentication, and display of applicable real-time information and data that are useful to achieve the virtual reality and transparent data display window processing of the disclosed embodiments. More particularly, data display interface module 818 and communications module 812 are used to facilitate the input/output and display of electronic data and other information to, illustratively, the users interfacing with the plurality of transparent data display windows (e.g., the transparent data display windows 614, 616, 618, 620, 622 and 624) and/or employing one or more user devices 900 (e.g., a touch screen of the user device 900) and executing the transparent data display window app 800. The data collection interface module 806 facilitates the collection of relevant data including, but not limited to, the information associated with the encrypted NFT data. The location-based services module 820 provides for the delivery of location-based services in order for the geographic locations of the users to be identified and displayed (e.g., GPS locations). The communications module 812 will facilitate communications by and through the controller device 200, for example.

Execution engine 802 may be employed to deliver the virtual reality and transparent data display window processing herein through the execution of the transparent data display window app 800. In such delivery, the execution engine 802 will operate and execute with at least the following program modules: blockchain/NFT administration & management module 804, data collection module 806, data display interface module 818, location-based services module 820, registration module 808, transparent data display window administration & management module 810, communications module 812, transparent data display window operations module 814, data encryption module 816, code reader module 822, digital wallet module 824, content creation and management module 826, and quantum processing module 828. The operations executed by the foregoing modules, for example, include, but are not limited to the operations discussed hereabove with respect the controller device 200 of any transparent data display window and to the operations set forth in FIG. 4, for example.

Those skilled in the art will appreciate that the present disclosure contemplates the use of systems configurations and/or computer instructions that may perform any or all of the operations involved in the transparent data display window processing hereunder. The disclosure of computer instructions that include, for example, the transparent data display window app 800 and the controller device 200 instructions is not meant to be limiting in any way. Those skilled in the art will readily appreciate that stored computer instructions and/or systems configurations may be configured in any way while still accomplishing the various goals, features, and advantages according to the present disclosure. The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system. Accordingly, the applications herein, for example, may be written using any number of programming languages and/or executed on compatible platforms including, but not limited to, JavaScript, PHP (PHP: Hypertext Preprocessor), WordPress, Drupal, Laravel, React.js, Angular.js, and Vue.js. Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on one or more standalone computers, partly on one or more standalone computers, as a stand-alone software package, partly on one or more standalone computers and partly on one or more remote computers, partly on one or more standalone computers and partly on one or more distributed computing environments (such as a cloud environment), partly on one or more remote computers and partly on one or more distributed computing environments, entirely on one or more remote computers or servers, or entirely on one or more distributed computing environments. Standalone computers, remote computers, and distributed computing environments may be connected to each other through any type of network or combination of networks, including local area networks (LANs), wide area networks (WANs), through the Internet (e.g., using an Internet Service Provider), or the connection may be made to external computers.

Figure 9:
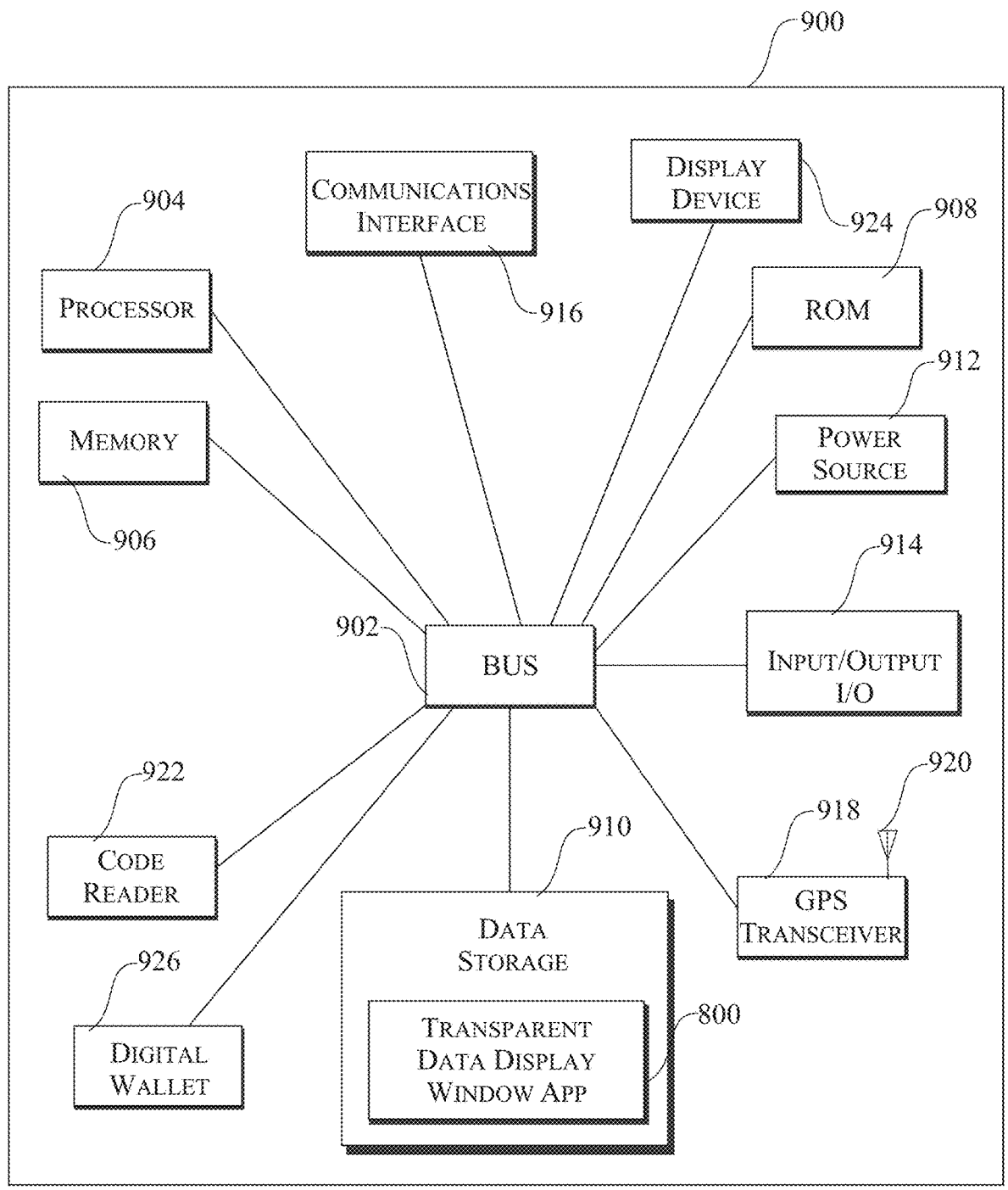
FIG. 9 an illustrative user device configured for use with a transparent data display window in accordance with an embodiment.

Turning our attention briefly to FIG. 9, an illustrative user device 900 is shown for deployment with and use with the transparent data display windows (e.g., the transparent data display window apparatus 100 and/or the transparent data display window apparatus 300) in accordance with an embodiment. The user device 900 typically includes bus 902 and processor 904 coupled to the bus 902 for executing operations and processing information. In an embodiment, one or more user devices may be used to engaged with one or more transparent data display windows to enable the virtual reality of processing of the disclosed embodiments. More specifically, one important aspect of the disclosed embodiments is directed to a user engaging in virtual reality experiences without the need for any special glasses and/or or headgear, and also provide for the extended play of the virtual reality experience from one transparent data window display to one or more other transparent data window display without the user losing their place in the virtual reality experience. That is, the display and the engagement by the user on the one or more other transparent data display windows continues from the exact time that user left the viewing of the virtual reality experience on the initial transparent data display window. In an embodiment, a unique time code is embedded within the at least one transparent data display window specific to a current display of the encrypted NFT data received on at least one transparent data display window, wherein the recorded unique time code is readable by the user device when proximate to the by at least another one transparent data display window. Illustratively, the user points their user device 900 at the subject transparent data display window and records the unique time code (e.g., using a QR code scanning function enabled by coder reader 922) and then moves to another location having one or more other transparent data display windows such that the previously recorded unique time code provided and transmitted, by the user device 900, to the one or more other transparent data display windows via their respective controller device 200. In accordance with an embodiment, the user device 900 comprises a one or more digital wallets 926 for storing a security code that is used for controlling secure access to the encrypted NFT data. In an embodiment, once a user has purchased, created and/or received particular encrypted NFT data they can access the NFTs through the blockchain (e.g., the blockchain 704) employing the user's pin code-enabled digital wallet (e.g., the digital wallet 926) on the user device 900 (e.g., a cellular phone or personal handheld device). The user's pin code is transmitted and received by all of the user's systems (i.e., any and all transparent data display windows whether singular or in a network, for example, the transparent data display window system 502) linked to the digital wallet whether in, for example, a vehicle, home, or office. In this way, the access point is from the handheld device received from the blockchain, for instance when in a car and the user has not finished a particular electronic game, such that the user can use the handheld device to record where the user left off in the game at the very second the user engagement ceased. In an embodiment, the user device 900 in addition to, or instead of, being linked to the digital wallet 926 may also be linked to a so-called cold storage wallet (also referred to as a "hardware wallet" or "offline wallet") that can be used offline and stored offline for further security. With a cold storage wallet, the wallet is stored in a platform that is not connected to the Internet, for example.

The master processor (e.g., resident in the master controller 504) employs a code generator and the unique time code is embedded and appears under the screen the particular transparent data display window (e.g., the transparent data display window apparatus 100) invisible to the naked eye and can be read by the user device 900 by holding (or pointing) the user device 900 at or up to the subject transparent data display window. In an embodiment, a QR code is used and read by the coder reader 922. As such, the same data resident on the user device 900 (and the particular application being executed, for example, a virtual reality game) in the user's home and/or in the user's office will recognize the encrypted NFT data and at what specific time the game was at when execution was interrupted in the particular transparent data display window interfaced with the user device 900. Thus, the embodiments herein facilitate the transportability of the content from a first environment (e.g., the user's car configured with one or more of the transparent data display windows hereunder) to at least a second environment (e.g., the user's office or home configured with one or more of the transparent data display windows hereunder). The respective controller device 200 then, using the received unique time code, enables the displaying, by at least another one transparent data display window (i.e., another display device), the current display of the encrypted NFT data from the exact time of the recording of the unique time code from the at least one transparent data window display.

As will be appreciated, a "user device" in the context herein may comprise a wide variety of devices such as any type of mobile device, smartphones, laptop computers, desktop computers, tablets, and wearable device, to name just a few, that execute applications (e.g., a mobile application) in accordance with the principles of the disclosed embodiments herein. For example, the execution of the operations of transparent data display window app 800. The processor 904, as powered by power source 912, may include both general and special purpose microprocessors, and may be the sole processor or one of multiple processors of the device. This is equally applicable to the processor 202 of FIG. 2. Further, the processor 904 (or the processor 202) may comprise one or more central processing units (CPUs) and may include, be supplemented by, or incorporated in, one or more application-specific integrated circuits (ASICs) and/or one or more field programmable gate arrays (FPGAs).

The user device 900 may also include memory 906 coupled to the bus 902 for storing computer-readable instructions to be executed by the processor 904. The memory 906 may also be utilized for storing temporary variables or other intermediate information during the execution of the instructions by the processor 904. The user device 900 may also include ROM 908 or other static storage device coupled to the bus 902. Further, data storage device 910, such as a magnetic, optical, or solid-state device may be coupled to the bus 902 for storing information and instructions for the processor 904 including, but not limited to, the transparent data display window app 800. Data storage device 910 (or the data storage device 210) and the memory 906 (and the memory 206) may each comprise a non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The user device 900 may also include one or more communications interface 916 for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 916 (or the communications interface 214) may be an integrated services digital network (ISDN) card or modem/router used to facilitate data communications of various well-known types and formats. Further, illustratively, the communications interface 916 (or the communications interface 214) may be a local area network (LAN) card used to provide data communication connectivity to a comparable LAN. Wireless communication links may also be implemented. The GPS transceiver 918 and antenna 920 facilitate delivery of location-based services in order to register the exact location of the user device 900, for example, as the user roams from one location to another location.

As will be appreciated, the functionality of the communications interface 916 (or the communications interface 214) is to send and receive a variety of signals (e.g., electrical, optical, or other signals) that transmit data streams representing various data types. The user device 900 may also include one or more input/output devices 914 that enable user interaction with the user device 900 (e.g., camera, display, keyboard, mouse, speakers, microphone, buttons, haptic accessories, etc.). The input/output devices 914 (or the I/O devices 216) may include one or more of the transparent data display windows hereunder, and peripherals, such as a camera, printer, scanner, display screen, haptic accessories, etc. Display device 924 may include a display such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device 900 or an associated display device, for example.

Figure 10:
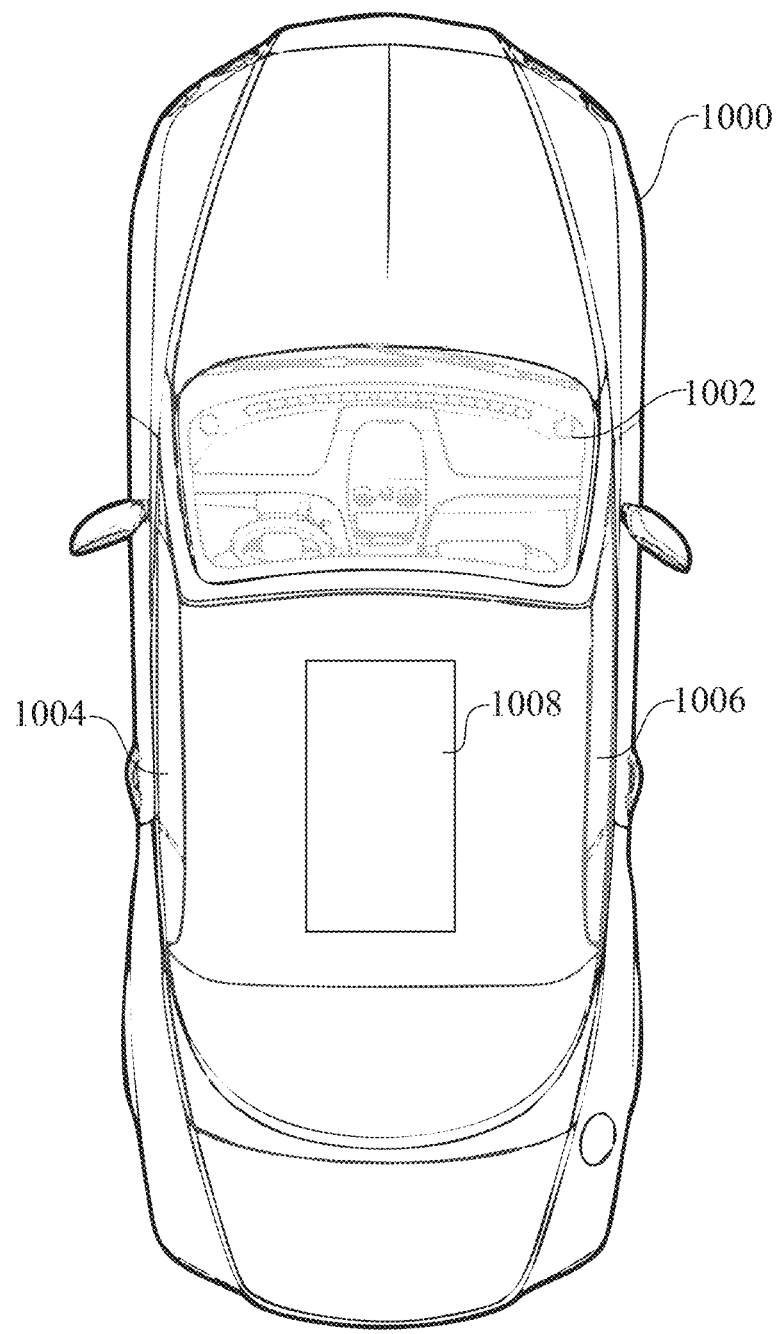
FIG. 10 presents an illustrative transportation medium configured with a plurality of transparent data display windows comprised by the transparent data display window of FIG. 1 in accordance with an embodiment.
Figure 11:
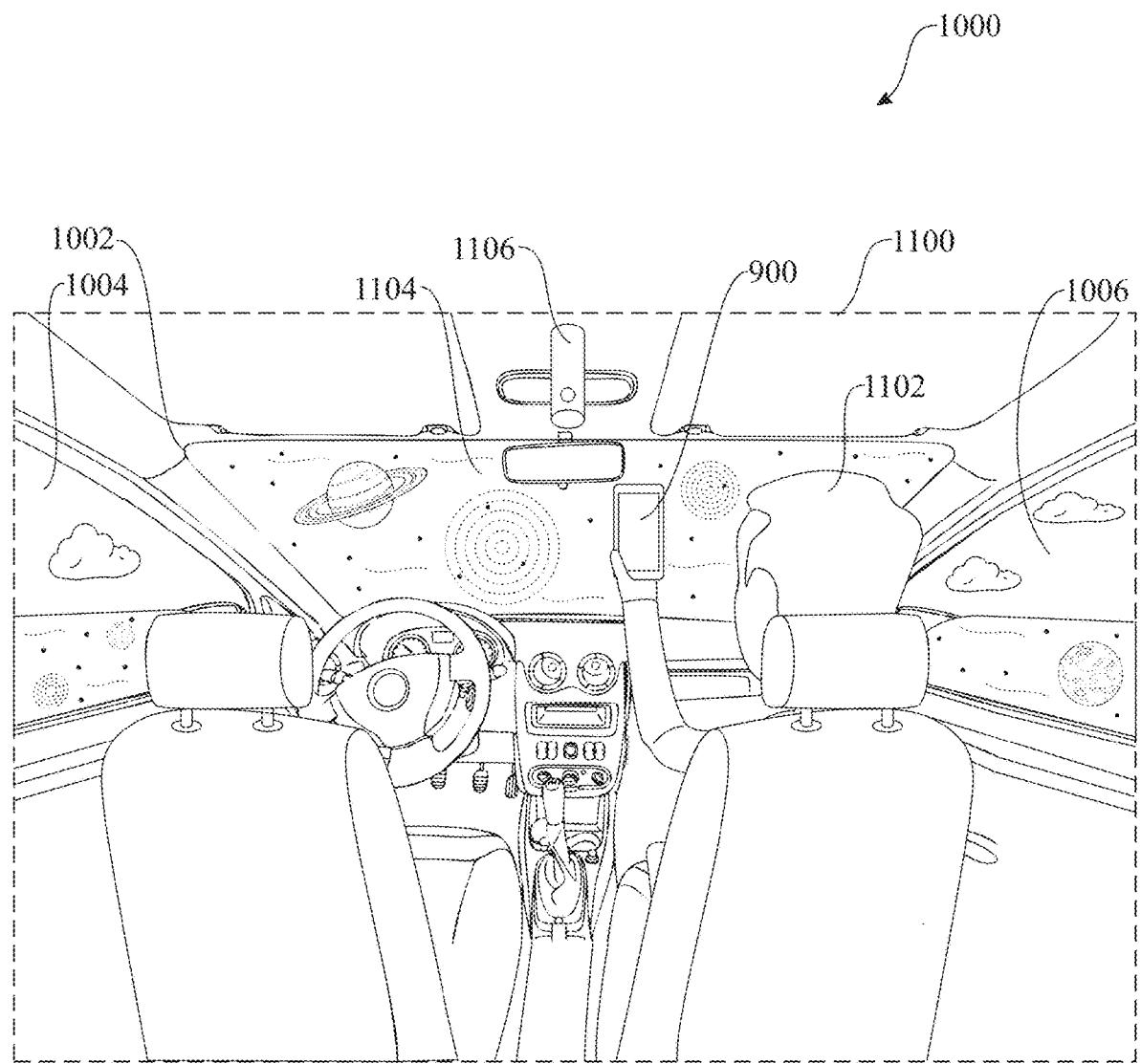
FIG. 11 presents a front and lateral-facing view of an interior of the illustrative transportation medium of FIG. 10 in accordance with an embodiment.
Figure 12:
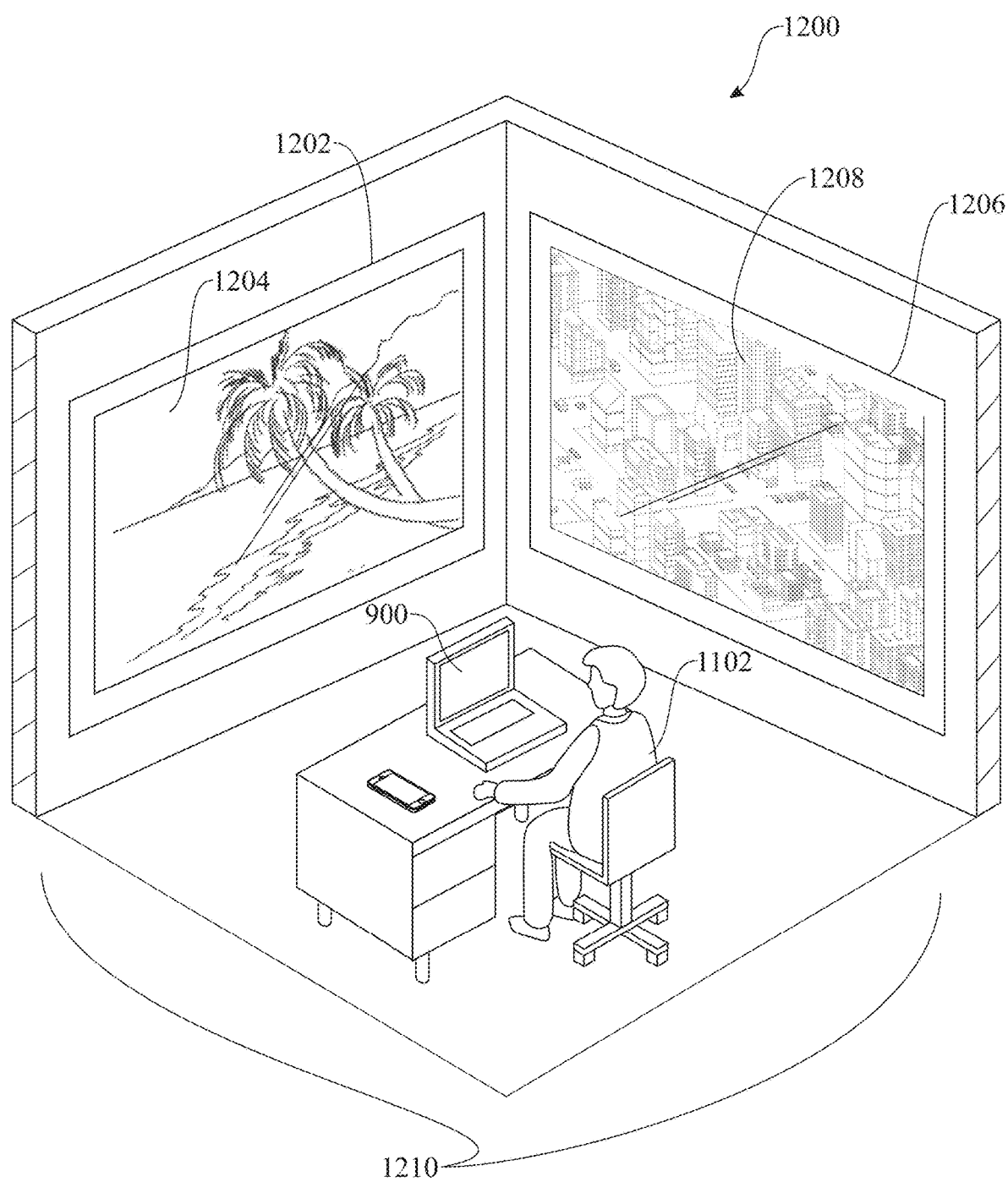
FIG. 12 presents an interior physical structure/infrastructure view configured with the transparent data display window apparatus of FIG. 3 in accordance with an embodiment.

Turning our attention to FIGS. 10, 11, and 12, these figures will be discussed together to further detail the above aspects of the disclosed embodiments. FIG. 10 presents an illustrative transportation medium 1000 configured with a plurality of transparent data display windows (i.e., transparent data display window apparatus 1002, transparent data display window apparatus 1004, transparent data display window apparatus 1006, and transparent data display window apparatus 1008) each such transparent data display window configured in accordance with the transparent data display window apparatus 100 of FIG. 1 in accordance with an embodiment. As will be appreciated, the illustrative transportation medium 1000 may be any type of transportation medium into which the transparent data display window may be installed including, but not limited to, cars (including smart cars), trucks, vans, recreational vehicles (RV), buses, trains, jeeps, and airplanes, to name just a few. In the instant example, the transparent data display window apparatus 1002, the transparent data display window apparatus 1004, the transparent data display window apparatus 1006, and the transparent data display window apparatus 1008 may form a transparent data display window system (e.g., the transparent data display window system 502) such that each of their respective controllers 200 are configured in a hierarchical network configuration comprising a master window controller (e.g., the master window controller 504 and a plurality of secondary window controllers (e.g., secondary window controllers 506, 508, and 510, respectively). In accordance with the embodiment each of the master window controller (e.g., the transparent data display window apparatus 1002 may serve as the master, and the plurality of secondary window controllers have a unique network address (e.g., an IP address). In this way, the master window controller and the plurality of secondary window controllers, and their respective transparent data display window (i.e., the transparent data display window apparatus 1002, the transparent data display window apparatus 1004, the transparent data display window apparatus 1006, and the transparent data display window apparatus 1008), can operate in either an independent fashion or in a cooperative fashion. The hierarchical network formed by the transparent data display window system comprising the transparent data display window apparatus 1002, the transparent data display window apparatus 1004, the transparent data display window apparatus 1006, and the transparent data display window apparatus 1008 is communicatively coupled (e.g., across a communications link) to the cloud network 518 comprising the server(s) 520, the access point(s) 522, and the database(s) 524. Thus, the virtual reality processing enabled by the transparent data display window system comprising the transparent data display window apparatus 1002, the transparent data display window apparatus 1004, the transparent data display window apparatus 1006, and the transparent data display window apparatus 1008 may be transmitted and communicated over any number of networks and individual user devices.

For example, turning our attention to FIG. 11 a front and lateral-facing view of an interior 1100 of the illustrative transportation medium 1000 of FIG. 10 is shown in accordance with an embodiment. As shown in FIG. 11, user 1102 is a passenger within the interior 1100 and using the user device 900 to engage with at least the transparent data display window apparatus 1002 of the transportation medium 1000. On the transparent data display window apparatus 1002 is an illustrative display 1104 which may be a virtual reality display from an electronic game that the user 1102 is currently executing and playing. Such rending of the display 1104 is produced by the transparent data display window apparatus 1002, which in the instant example may comprise the master window controller (e.g., the master window controller 504) of the transparent data display window system comprising the transparent data display window apparatus 1002, the transparent data display window apparatus 1004, the transparent data display window apparatus 1006, and/or the transparent data display window apparatus 1008 (not shown). Camera 1106 (e.g., a panoramic camera) is installed within the interior of the transportation medium 1000 such that the camera 1106 (one or more of such cameras may be used in various embodiments) may be used by the user 1102 to create content by and through one or more of the transparent data display windows (i.e., the transparent data display window apparatus 1002, the transparent data display window apparatus 1004, the transparent data display window apparatus 1006, and the transparent data display window apparatus 1008). Such user-created content is itself encrypted NFT data that becomes part of the applicable blockchain. The camera 1106 may also be used to track the movements of the user 1102 that may also serve as input to the user-created content or be used independently. Further, in an embodiment, the virtual reality simulated immersive environment provided to the user 1102 may include sensory experiences that seek to replicate the sensory experience of the user's physical presence in an artificial environment, such as a reality-based environment or a non-reality-based environment, such as a video game. This virtual reality experience may include the use of audio and/or haptic components, in addition to a visual component within the transportation medium 1000 (e.g., one or audio speakers and/or a haptic device configured to be attached to the body of the user 1102). This immersive environment may also include sound provided through speakers or headphones and force feedback via, for example, a dynamic platform or a vibrating controller or joystick.

The user device 900 of FIG. 11 comprises a digital wallet (e.g., the digital wallet 926) for storing a security code that is used for controlling secure access to the encrypted NFT data for the rendering of the display 1104. In the embodiment, once the user 1102 has purchased and received particular encrypted NFT data (e.g., for the electronic game being executed) they can access the NFTs through the blockchain (e.g., the blockchain 704) employing the user's pin code enabled digital wallet (e.g., the digital wallet 926) on the user device 900. The user's pin code is transmitted and received by all of the user's systems (i.e., any and all transparent data display windows whether singular or in a network, in the instant embodiment, the transparent data display window apparatus 1002, the transparent data display window apparatus 1004, the transparent data display window apparatus 1006, and/or the transparent data display window apparatus 1008) linked to the digital wallet whether in, for example, the transportation medium 1000, the user's home (not shown) or the user's office (see, e.g., FIG. 12). In this way, if the user 1102 has not finished the electronic game underway, the user 1102 may use the user device 900 from the interior 1100 of the transportation medium 1000 to record where the user 1102 has ceased execution and left off in the game at the very second as displayed on the transparent data display window apparatus 1002. The master processor (e.g., resident in the master controller 200 of the transparent data display window apparatus 1002) employs a code generator and the time code appears under the screen of the transparent data display window apparatus 1002 invisible to the naked eye of the user 1102 but and readable by the user device 900 by holding (or pointing) the user device 900 up to the transparent data display window apparatus 1002, as demonstrated in FIG. 11. In an embodiment, a QR code is used and read by the coder reader 922 of the user device 900 of the user 1102. As such, the same data resident on the transparent data display window apparatus 1002 and/or the user device 900 (and the particular application being executed, for example, the electronic game) in the user's home and/or in the user's office will recognize the encrypted NFT data and at what specific time the game was at when execution was interrupted at this first time on the transparent data display window apparatus 1002. Thus, the embodiments herein facilitate the transportability of the content from a first environment (e.g., the transportation medium 1000) to at least a second environment (e.g., the user's office 1210, as shown in FIG. 12), as will now be discussed. Further, in an embodiment, the transparent data display window apparatus (e.g., the transparent data display window apparatus 1002) may deliver a visual overlay across any particular actively rendered display (e.g., display 1104)

that comprises encrypted NFT data from multiple NFTs such that completely different images may be displayed opposite one another on a simultaneous basis. As such, there may be multiple image overlays in the any particular one rendered display by any particular one transparent data window apparatus.

Turning our attention to FIG. 12, presents an interior physical structure/infrastructure configuration 1200 comprising transparent data display window 1202 and transparent data display window 1206, each of which is configured in accordance with the transparent data display window apparatus 300 of FIG. 3 in accordance with an embodiment. As will be appreciated, the illustrative physical structure/infrastructure configuration 1200 may be directed to any type of physical structure or infrastructure into which the transparent data display window may be installed including, but not limited, buildings, homes, smart homes, shopping centers and malls, to name just a few. Further, the transparent data display window apparatus 300 may be configured for portability by the user. As such, the principles of the disclosed embodiments expand the capabilities of such physical structures and physical structure/infrastructure by and through the installation and use of the transparent data display windows that, for example, increase occupant productivity and comfort. Continuing with the illustrative example as introduced by the discussion of FIG. 11 herein above, the user 1102 has now moved to their office 1210 (from the transportation medium 1000, as detailed above) within the interior physical structure/infrastructure configuration 1200 (e.g., the user's office building) comprising the transparent data display window 1202 and the transparent data display window 1206. Now, the user 1102 will be employing their second user device 900 (e.g., a laptop computer) in their office 1210 setting such that the same data display rendered on the transparent data display window apparatus 1002 (and the particular application being executed, for example, the electronic game) at the specific time the game (i.e., a first time) was at when execution was interrupted at this first time on the transparent data display window apparatus 1002 and execution thereof will re-start at a second time on the transparent data display window 1202 such that display 1204 will be rendered staring at the very instant of time the game ceased execution on the transparent data display window apparatus 1002. Of course, the user 1102 may have also used their first device 900 to also initiate the rendering of the display 1204 on the transparent data display window 1202. Further, in the embodiment shown in FIG. 12, the user 1102 is now also executing a second application such that display 1208 is being rendered on the transparent data display window 1206 substantially concurrently with the display 1204 on the transparent data display window 1202. In this way, the user 1102 may be viewing two or more independent displays as rendered by their respective transparent data display windows. Further, the transparent data display window 1202 and the transparent data display window 1206 may form their own transparent data display window system (and associated hierarchical network) or may be part of the transparent data display window system (and the associated hierarchical network) comprising the transparent data display window apparatus 1002, the transparent data display window apparatus 1004, the transparent data display window apparatus 1006, and/or the transparent data display window apparatus 1008.

As noted above, in some embodiments the method or methods described above may be executed or carried out by a computing system including a non-transitory computer-readable storage medium, also described herein as a storage machine, that holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method (see, e.g., FIG. 4) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high-level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A transparent data display window apparatus comprising:
 a transparent data display encased by a border; and
 a controller device integrally connected with the transparent data display; wherein the controller device further comprises at least one processor and at least one memory storing instructions that when executed cause the at least one processor to perform operations comprising:
 receiving a plurality of encrypted non-fungible token (NFT) data;
 displaying, on the transparent data display, the encrypted NFT data received; and
 generating and embedding a unique time code within the transparent data display specific to a current display of the encrypted NFT data on the transparent data display, wherein the unique time code embedded is readable and recordable at a particular time by a user device proximate to the transparent data display window apparatus and useful for continuing the current display of the encrypted NFT data from the particular time of a recording of the unique time code embedded by the user device proximate to the transparent data display on a display device other than the transparent data display.

2. The transparent data display window apparatus of claim 1, wherein the border of the transparent data display comprises a polycarbonate material.

3. The transparent data display window apparatus of claim 1, wherein the display device is another transparent data display window apparatus.

4. The transparent data display window apparatus of claim 1, wherein the unique time code embedded is a quick response (QR) code.

5. The transparent data display window apparatus of claim 1, wherein the transparent data display window apparatus further comprises:
 at least one green screen overlay integrated with the transparent data display.

6. The transparent data display window apparatus of claim 1, wherein the transparent data display window apparatus further comprises:
 at least one privacy tint overlay integrated with the transparent data display.

7. The transparent data display window apparatus of claim 1, wherein each encrypted NFT of the plurality of encrypted NFT data represents a defined time interval of content displayed on the transparent data display.

8. The transparent data display window apparatus of claim 1, wherein each encrypted NFT of the plurality of encrypted NFT data is a particular one block in a plurality of blocks of a blockchain.

9. The transparent data display window apparatus of claim 1, wherein the transparent data display window apparatus is configured to operate with one or more auditory devices and one or more haptic devices for providing sound and haptic experiences to a user during the displaying of the encrypted NFT data received on the transparent data display.

10. The transparent data display window apparatus of claim 1, wherein the transparent data display window apparatus system is configured for integration with a transportation medium.

11. The transparent data display window apparatus of claim 10, wherein the transportation medium is at least one of a vehicle, a car, a truck, a van, a recreational vehicle (RV), a bus, a train, a jeep, and an airplane.

12. The transparent data display window apparatus of claim 1, wherein the transparent data display window apparatus is configured for integration with a physical structure.

13. The transparent data display window apparatus of claim 12, wherein the physical structure is at least one of a building, a home, a shopping center, and a mall.

14. The transparent data display window apparatus of claim 1, wherein the plurality of encrypted NFT data is accessed using a security code retrievable from a digital wallet associated with the user device.

15. The transparent data display window apparatus of claim 1, wherein the displaying of the encrypted NFT data received on the transparent data display window apparatus delivers an enhanced immersive user experience to a user.

16. A transparent data display window apparatus comprising:
 a transparent data display encased by a border; and
 a controller device integrally connected with the transparent data display; wherein the controller device further comprises at least one processor and at least one memory storing instructions that when executed cause the at least one processor to perform operations comprising:
 receiving a plurality of encrypted non-fungible token (NFT) data, wherein each encrypted NFT of the plurality of encrypted NFT data represents a defined time interval of content for display on the transparent data display, and is a particular one block in a plurality of blocks of a distributed ledger technology (DLT);
 displaying, on the transparent data display, the encrypted NFT data received, and
 generating and embedding a unique time code within the transparent data display specific to a current display of the encrypted NFT data on the transparent data display, wherein the unique time code embedded is readable and recordable at a particular time by a user device proximate to the transparent data display window apparatus and useful for continuing the current display of the encrypted NFT data from the particular time of a recording of the unique time code embedded by the user device proximate to the transparent data display on a display device other than the transparent data display.

17. The transparent data display window apparatus of claim 16, wherein the transparent data display window apparatus is configured for integration with either a transportation medium or a physical structure.

18. The transparent data display window apparatus of claim 16, wherein the plurality of encrypted NFT data is accessed using a security code retrievable from a digital wallet associated with the user device.

19. The transparent data display window apparatus of claim 16, wherein the displaying of the encrypted NFT data received on the transparent data display window apparatus delivers an enhanced immersive user experience to a user.

20. A transparent data display window apparatus comprising:
 a transparent data display encased by a border;
 at least one green screen overlay integrated with the transparent data display for providing a background presentation feature thereto;
 at least one privacy tint overlay integrated with the transparent data display for providing an opaque window feature thereto; and n
 a controller device integrally connected with the transparent data display; wherein the controller device further comprises at least one processor and at least one memory storing instructions that when executed cause the at least one processor to perform operations comprising:
accessing, using a security code retrievable from a digital wallet associated with a user device, and receiving a plurality of encrypted non-fungible token (NFT) data, wherein each encrypted NFT of the plurality of encrypted NFT data represents a defined time interval of content for display on the transparent data display, and is a particular one block in a plurality of blocks of a blockchain;
displaying, on the transparent data display, the encrypted NFT data received,
generating and embedding a unique time code within the transparent data display specific to a current display of the encrypted NFT data on the transparent data display, wherein the unique time code embedded is readable and recordable at a particular time by the user device proximate to the transparent data display window apparatus and useful for continuing the current display of the encrypted NFT data from the particular time of a recording of the unique time code embedded by the user device proximate to the transparent data display on a display device other than the transparent data display;
wherein the display device is another transparent data display window apparatus;
wherein the transparent data display window apparatus is configured for integration with either a transportation medium or a physical structure; and
wherein the displaying of the encrypted NFT data received on the transparent data display window apparatus delivers an enhanced immersive user experience to a user.

\* \* \* \* \*